United States Patent Office 2,930,367
Patented Mar. 29, 1960

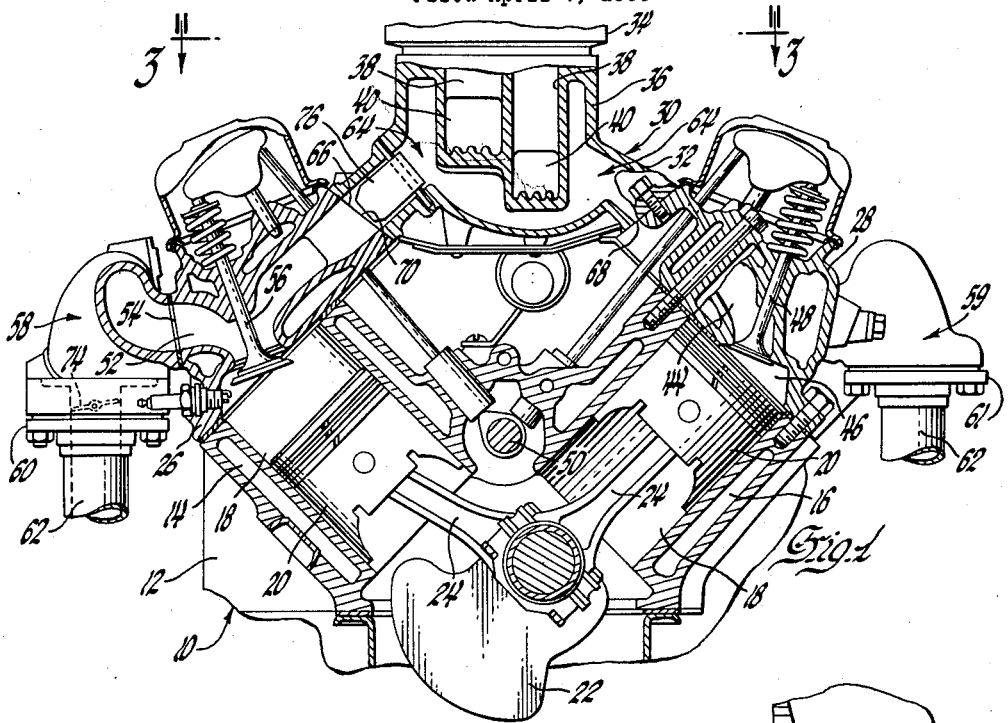

2,930,367

HEAT VALVE

Adelbert E. Kolbe and Jack M. Roberts, Detroit, Mich., assignors to General Motors Corporation, Detroit, Mich., a corporation of Delaware Application April 7, 1955, Serial No. 499,785

7 Claims. (Cl. 123—122)

The present invention relates to internal combustion engines and more particularly to means for heating the combustible charge in the induction system.

Internal combustion engines of the spark ignited variety normally employ a carburetor for developing a combustible charge comprising a mixture of air and atomized fuel. The charge flows from the carburetor through induction passages in an intake manifold to the combustion chambers. Under some operating conditions particularly when the engine is below normal operating temperatures, the particles of fuel in the charge may tend to precipitate out of the charge and condense on the walls of the induction passages. Since this results in a very lean mixture reaching the combustion chamber, it may be desirable to heat the walls of the induction passages under such circumstances. This may be accomplished by diverting the hot exhaust gases of the engine through the intake manifold in heat exchanging relation with the induction passages. Heretofore a heat valve responsive to the engine temperature has normally been placed in the exhaust system for diverting the flow of gases from the exhaust system into the intake manifold so as to heat the charge therein. Once the engine has attained normal operating temperatures, this exhaust heat valve may open and allow the normal flow of exhaust gases through the exhaust system. However, it has been found that even when the heat valve is open, especially in V-type engines, there is still a sufficient amount of exhaust gas pulsating through the exhaust passages in the cylinder heads to enter into the intake manifold. This will thus heat the charge and decrease the volumetric efficiency of the engine.

It is now proposed to provide an inexpensive means for effectively eliminating the flow of exhaust gases through the intake manifold. This is to be accomplished by providing a thermostatic valve in the entrance to the exhaust passage in the intake manifold which will thus block the flow of any exhaust gases therethrough. This valve may be a novel bi-metallic valve of the so-called "duck-bill" type. The valve may include a pair of substantially identical leaves which are mounted on a pin that extends across the exhaust passage. These leaves may be bi-metallic with the ends of the leaves being secured on one side of the pin while the leaves extend around the pin on the opposite sides thereof. Thus the leaves will be disposed in the exhaust passage directly in the flow of exhaust gases. When the leaves are at ambient temperature, they will contract toward each other and allow the free flow of exhaust gases therepast. However, as the gases become hot, the leaves will expand and separate to close the passage. This will thus effectively prevent the flow of substantially all of the exhaust gases that would heat the charge.

In the one sheet of drawings:

Figure 1 is a cross sectional view of an engine employing the present invention.

Figure 2 is an enlarged veiw of a portion of the engine of Figure 1 showing the heat valve therefor.

Figure 3 is a plan view of a portion of the intake manifold with portions thereof being broken away.

Although the present invention may be adapted for installation on any suitable engine, it is employed on an engine 10 having a cylinder block 12 wtih a pair of angularly disposed banks 14 and 16 of cylinders 18. A piston 20 may be reciprocably disposed in each of these cylinders 18 and connected to a crankshaft 22 by means of piston rods 24. A cylinder head 26 and 28 may be secured to each bank 14 and 16 of cylinders 18 so that cavities therein will register with the open ends of the cylinders 18 and cooperate with the pistons 20 to form combustion chambers.

In order to charge the cylinders, an induction system 30 may be provided between the two banks 14 and 16. The present induction system 30 includes an intake manifold 32 secured to the heads 26 and 28 and a carburetor 34 mounted on top of a carburetor riser 36 projecting vertically from the center of the intake manifold 32. This riser 36 may include one or more substantially vertical mixture supply passages 38 that are positioned to register with the charge forming passages in the carburetor. The lower ends of these supply passages 38 may communicate with the distribution passages 40 in the intake manifold 32. At the same time the outer ends of these distribution passages 40 may in turn communicate with the intake ports on the inner sides of the cylinder heads 26 and 28. These ports are formed by the ends of the intake passages 44 which extend transversely of the heads and communicate with the combustion chambers 46. Thus a combustible charge may be formed in the carburetor 34 and delivered through the passages to the combustion chambers. An inlet valve 48 controlled by a camshaft 50 may be provided in each of the intake passages 44 for controlling the flow of the charge therethrough.

Exhaust passages 52 may also extend transversely through the cylinder heads 26 and 28 and form exhaust ports 54 on the outside of the cylinder heads 26 and 28. An exhaust valve 56 controlled by the camshaft 50 may be provided in each passage 52 for controlling the flow of exhaust gases out of the cylinders. Exhaust manifolds 58 and 59 may extend along opposite sides of the engine 10 for collecting the exhaust gases. Each of these manifolds 58 and 59 may have an outlet 60 and 61 for discharging the exhaust gases into the exhaust pipes 62.

When the engine 10 is operating at sub-normal temperatures and/or the air in the charge is cold, a considerable portion of the fuel particles may precipitate from the charge and collect on the walls of the induction passages. As a result of this precipitation of fuel, the charge which actually reaches the combustion chambers is excessively lean and as a result, it is extremely difficult to start and/or operate the engine.

In order to reduce the objectionable effects of such precipitation, it is desirable to heat the charge when the engine 10 is cold. This may be accomplished by providing an exhaust crossover passages 64 through the intake manifold 32 so as to be in heat exchanging relation with the walls of the induction passages 38 and 40. The opposite ends of the crossover passage may form ports 66 and 68 which will register with exhaust ports 70 on the inside of the cylinder heads. These exhaust ports 70 may be formed by the exhaust passages 52 for one or more of the cylinders extending entirely through the heads 26 and 28 to form interconnected exhaust ports 54 and 70 on the insides and outsides of the cylinder heads 26 and 28. Thus the exhaust gases from these cylinders may flow into an exhaust manifold 58 and 59 and/or into the crossover passage 64 and heat the induction passages and the charge therein. In order to increase this flow of exhaust gases, a heat valve 74 may be disposed in one of the exhaust outlets 60 to reduce the flow of exhaust gases therefrom. Thus when this valve 74 is closed the exhaust gases from the one bank 14 will back up in the manifold 58 and flow through the middle exhaust passage 52 into the crossover passage 64. After these gases have heated the induction passages and the charge therein, they will flow through the other exhaust passage 52 into the manifold 59 on the opposite side of the engine 10. All of the exhaust gases may then flow into the exhaust pipe 62. The exhaust gases in the crossover passage 64 will cause the walls of the induction passages to very rapidly become heated. Thus if any fuel particles strike the surfaces of the induction passages, the heat will cause an immediate re-evaporation of such fuel particles.

Once the engine 10 has attained normal operating temperatures and the fuel does not tend to precipitate, there is no longer a need for heating of the charge. Accordingly, a thermostat responsive to the temperature of the engine may be provided for actuating the heat valve 74.

When the heat valve 74 is open, the exhaust gases will be free to flow from both of the exhaust manifolds 58 and 59 into the exhaust system. However, even when this valve 74 is open, there will be a certain amount of exhaust gases, particularly those discharged from the center cylinders into the exhaust passages, which will pulsate through the crossover passage 64. These gases will contain sufficient heat to raise the temperature of the induction passages and materially lower the volumetric efficiency.

In order to eliminate this unwanted heating of the charge, a secondary heat valve 76 may be provided adjacent the inlet 66 to the crossover passage 64. The present valve 76 is a so-called "duck-bill" valve having a pair of substantially identical leaves 78 and 80 for controlling the flow of gases therepast. This valve 76 may include a pin 82 which extends transversely of the crossover passage 64 with the opposite ends being secured in the intake manifold 32. A sleeve 84 may fit around this pin 82 with the sides thereof forming a pair of mating flanges 86 which extend along the rear side of the sleeve 84. This sleeve 84 is preferably sufficiently tight on the pin 82 to prevent any relative movement. One end of each sleeve 78 and 80 may have a mounting flange 88 thereon adapted to be secured to the flange 86 on the sleeve 84. The leaves 78 and 80 will then extend around the pin 82 and along the passage towards the flow of the exhaust gases. Thus if the leaves 78 and 80 are welded or otherwise secured along the seam 90 on the edges of the flanges 86 and 88, the effective length thereof will be increased and the accuracy of the valve 76 will be improved.

Each of the leaves 78 and 80 may include an inner layer 91 and an outer layer 92 that contain dissimilar metals. The inside layer 91 may be a material having a higher coefficient of thermal expansion than the outer layer 92. Thus even though the leaves 78 and 80 are together when they are cold, as they become heated, the inner layer 91 will expand faster than the outer layer 92 thus causing the leaves 78 and 80 to separate.

When the engine 10 is cold, these leaves 78 and 80 will contract until they touch each other as shown in Figure 3. This will thus present the minimum amount of obstruction to the flow of exhaust gases through the crossover passage 64. When the engine 10 is cold, the heat valve 74 will be closed. Thus the hot exhaust gases will be forced to flow from the exhaust manifold 58 through the exhaust passage 52 into the crossover passage 64 and thereby heat the charge. As the engine becomes heated, the thermostat will open the heat valve 74 and thus allow the exhaust gases in both exhaust manifolds 58 and 59 to leave through both of the outlets 60 and 62. However, it should be noted that at the same time the temperature of the exhaust gases will increase and cause the leaves 78 and 80 of the secondary valve 76 to spread apart until such time as they engage the side walls of the crossover passage. This will effectively prevent the flow of any of the hot exhaust gases through the crossover passage 64.

Various changes and modifications of the embodiment of the invention described herein may be made by those skilled in the art without departing from the spirit and principles of the invention.

What is claimed is:

1. A heat valve adapted to be disposed in a passage for controlling the flow of gases therethrough, said valve comprising mounting means adapted to extend transversely through said passage, said mounting means including a sleeve having flange that extends longitudinally thereof, a pair of substantially identical thermally responsive leaves having the mounting ends thereof secured to said flange, a pin extending through said sleeve and having the ends thereof anchored in the walls of said passage.

2. A thermostatic heat valve adapted to be disposed in an exhaust passage for controlling the flow of exhaust gases therethrough, said valve comprising a mounting pin adapted to extend transversely through said passage, a sleeve disposed around said pin and having flange means running longitudinally thereof, a pair of substantially identical leaves, each of said leaves including a mounting portion adjacent one end thereof, said portion being secured to said flange so that said leaves will extend around said pin with said ends thereof being disposed on the opposite sides of said pin.

3. A heat valve adapted to be disposed in an exhaust passage for substantially reducing the flow of exhaust gases through said exhaust passage when the temperature of said gases exceeds a predetermined amount, said valve including mounting means having a pin adapted to extend transversely of said passage with the opposite ends thereof being anchored in the walls of said passage and a sleeve disposed about said pin and including a flange extending longitudinally thereof, a pair of substantially identical leaves having the mounting ends thereof secured to said flange so that said leaves will extend around the opposite sides of said mounting means, each of said leaves including inner and outer layers of dissimilar metals, said inner layers having a higher coefficient of thermal expansion than said outer layer so that when the temperature of said exhaust gases exceeds a predetermined amount, the relative expansion of said inner and outer layers will cause said leaves to pivot on said flange for engagement with the walls of said exhaust passage to substantially prevent the flow of exhaust gases therethrough.

4. A heat valve adapted to be disposed in an exhaust passage for substantially reducing the flow of exhaust gases therethrough when the temperature of said gases exceeds a predetermined amount, said valve comprising a pin adapted to extend transversely of said passage and have the ends thereof anchored in the walls of said passage, a sleeve which is adapted to be disposed concentrically about said pin and having a flange extending longitudinally thereof, a pair of substantially identical thermostatic leaves having the mounting ends thereof secured to the opposite sides of said flange so that said leaves will extend around the opposite sides of said sleeve.

5. The combination of claim 4 wherein each of said leaves includes inner and outer layers of dissimilar metal, said inner layers having a higher coefficient of thermal expansion than said outer layers so that when the temperature of said exhaust gases exceeds a predetermined amount, the relative expansion of said inner and outer layers will cause said leaves to separate from each other for engagement with the walls of said exhaust passage to substantially prevent the flow of exhaust gases therethrough.

6. In an exhaust passage in which the exhaust gases tend to flow primarily from the inlet end thereof towards the outlet end thereof, an exhaust heat valve adapted to control the flow of exhaust gases therethrough, said valve comprising mounting means having a pin extending across said passage with the opposite ends thereof embedded in the walls of said passage and encompassed by a sleeve with a flange on the downstream side thereof extending longitudinally of said passage, a pair of substantially identical thermostatic leaves having the first ends thereof secured to said flange so that said leaves extend around the opposite sides of said mounting means, the opposite ends of said leaves being disposed on the upstream side of said mounting means.

7. The method of assembling a heat valve in a passage extending through a housing, said method comprising securing the ends of a pair of substantially identical thermostatic elements to a sleeve, placing said sleeve with said elements secured thereto into said passage with said sleeve being in alignment with a pair of registering holes extending through the opposite walls of said passage, and inserting a pin from outside of said housing through said holes and into said sleeve so that the ends of said pin will be anchored in the walls of said passage for retaining said valve in position.

References Cited in the file of this patent

UNITED STATES PATENTS

| | | |
|---|---|---|
| 1,507,315 | Hunt | Sept. 2, 1924 |
| 1,608,205 | Francke | Nov. 23, 1926 |
| 1,643,957 | Redmond | Oct. 4, 1927 |
| 1,889,270 | Thomas et al. | Nov. 29, 1932 |
| 1,998,636 | Porter | Apr. 23, 1936 |
| 2,054,997 | Vang | Sept. 22, 1936 |
| 2,109,628 | Alban et al. | Mar. 1, 1938 |
| 2,523,611 | Clayton | Sept. 26, 1950 |
| 2,603,199 | Moseley | July 15, 1952 |
| 2,673,687 | Alban et al. | Mar. 30, 1954 |
| 2,725,862 | Dolza | Dec. 6, 1955 |
| 2,730,091 | Burrell | Jan. 10, 1956 |